(12) United States Patent
King et al.

(10) Patent No.: US 7,533,775 B2
(45) Date of Patent: May 19, 2009

(54) SEPARATION OF FINE GRANULAR MATERIALS

(75) Inventors: Peter John King, Nottingham (GB); Michael Robert Swift, Nottingham (GB); Nasreen Burtally, Nottingham (GB)

(73) Assignee: The University of Nottingham (GB)

( * ) Notice: Subject to any disclaimer, the term of this patent is extended or adjusted under 35 U.S.C. 154(b) by 0 days.

(21) Appl. No.: 10/491,849

(22) PCT Filed: Oct. 3, 2002

(86) PCT No.: PCT/GB02/04463

§ 371 (c)(1),
(2), (4) Date: Sep. 30, 2004

(87) PCT Pub. No.: WO03/028877

PCT Pub. Date: Apr. 10, 2003

(65) Prior Publication Data

US 2005/0029167 A1 Feb. 10, 2005

(30) Foreign Application Priority Data

| Oct. 4, 2001 | (GB) | ................................. 0123839.3 |
| Nov. 2, 2001 | (GB) | ................................. 0126370.6 |
| Mar. 6, 2002 | (GB) | ................................. 0205204.1 |
| Aug. 13, 2002 | (GB) | ................................. 0218794.6 |

(51) Int. Cl.
*B03B 5/62* (2006.01)
*B03B 5/66* (2006.01)
*B07B 13/00* (2006.01)

(52) U.S. Cl. ........................ 209/159; 209/437; 209/480

(58) Field of Classification Search ................. 209/699, 209/158, 159, 479, 480, 481, 422, 435, 437, 209/438, 440, 446, 448, 504, 485
See application file for complete search history.

(56) References Cited

U.S. PATENT DOCUMENTS 3,774,759 A * 11/1973 Weintraub et al. .......... 209/474

(Continued)

FOREIGN PATENT DOCUMENTS

DE 2357227 3/1975

(Continued)

OTHER PUBLICATIONS

Bizon, C. et al., "Patterns in 3D Vertically Oscillated Granular Layers: Simulation and Experiment," Physical Review Letters, Jan. 5, 1998, pp. 57-60, vol. 80, No. 1, The American Physical Society.

(Continued)

*Primary Examiner*—Patrick Mackey
*Assistant Examiner*—Mark Hageman
(74) *Attorney, Agent, or Firm*—Michael Best & Friedrich LLP

(57) ABSTRACT

This application concerns the separation of fine granular mixtures that may occur when the grains are suitably vibrated within fluid. In particular, the present invention provides a method of separating a particulate mixture comprising different particle types, comprising subjecting a supported particle bed comprising a fluid and said particulate mixture to a vibration thereby to effect separation of the particulate mixture into strata each of which is preferentially rich in substantially one particle type. Apparatus for effecting the above method also provided.

13 Claims, 12 Drawing Sheets

U.S. PATENT DOCUMENTS

Figure 1:
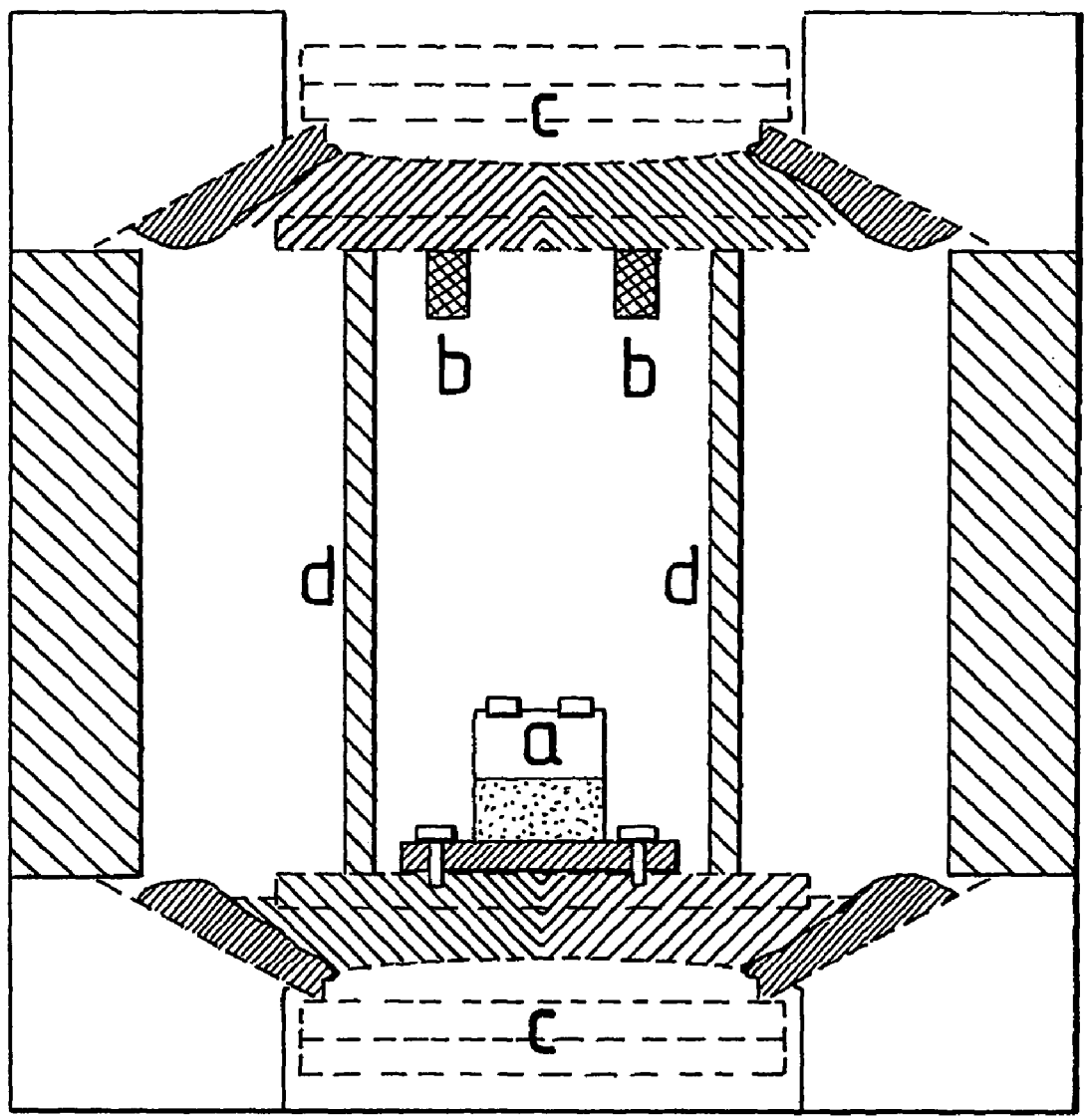

| | | | | |
|---|---|---|---|---|
| 4,070,275 | A * | 1/1978 | Stoev et al. | 209/44 |
| 4,240,903 | A * | 12/1980 | Stoev et al. | 209/437 |
| 4,316,799 | A * | 2/1982 | Satake | 209/504 |
| 4,572,439 | A | 2/1986 | Pitzer | |
| 4,765,489 | A * | 8/1988 | Satake | 209/557 |
| 4,946,586 | A * | 8/1990 | Fletcher | 209/435 |
| 5,024,334 | A | 6/1991 | Misra et al. | |
| 5,148,922 | A * | 9/1992 | Marriott | 209/489 |
| 5,160,035 | A * | 11/1992 | McConnell | 209/439 |
| 5,375,720 | A * | 12/1994 | Piggott et al. | 209/44 |
| 5,943,231 | A * | 8/1999 | Thomas | 700/28 |
| 5,996,808 | A * | 12/1999 | Levy et al. | 209/474 |
| 6,907,996 | B1 * | 6/2005 | Fraas | 209/435 |
| 6,938,776 | B2 * | 9/2005 | Rem et al. | 209/13 |
| 2002/0117428 | A1 * | 8/2002 | Rapaport | 209/481 |

FOREIGN PATENT DOCUMENTS

| | | |
|---|---|---|
| DE | 3517309 | 11/1986 |
| FR | 782279 | 6/1935 |
| JP | 56021638 | 2/1981 |
| JP | 2068157 | 3/1990 |
| JP | 2001017927 | 1/2001 |
| JP | 2002326057 | 11/2002 |
| WO | WO 9747405 | 12/1997 |

OTHER PUBLICATIONS

Das, Pranab K. et al., "Phase Boundaries in Vertically Vibrated Granular Materials," Physics Letters A 242 (1998), Jun. 8, 1998, pp. 326-328, published by Elsevier Science B.V.

Rosato, Anthony et al., "Why the Brazil Nuts are on Top: Size Segregation of Particulate Matter by Shaking," Physical Review Letters, Mar. 9, 1987, pp. 1038-1040, vol. 58, No. 10, The American Physical Society.

Pak, H.K. et al., "Effects of Ambient Gases on Granular Materials under Vertical Vibration," Physical Review Letters, Jun. 5, 1995, pp. 4643-4646, vol. 74, No. 23, The American Physical Society.

Evesque, P. et al., "Instability in a Sand Heap," Physical Review Letters, Jan. 2, 1989, pp. 44-46, vol. 62, No. 1, The American Physical Society.

Duran, Jacques, "Ripples in Tapped or Blown Powder," Physical Review Letters, May 29, 2000, pp. 5126-5129, vol. 84, No. 22, The American Physical Society.

Thomas, Benku et al., "Support for Faraday's View of Circulation in a Fine-Powder Chladni Heap," Physical Review Letters, Jul. 20, 1998, pp. 574-577, vol. 81, No. 3, The American Physical Society.

Kumar, Krishna et al., "Shape of Convective Cell in Faraday Experiment with Fine Granular Materials," Physica A, 1999, pp. 97-104, published by Elsevier Science B.V.

Ottino, J.M. et al., "Mixing and Segregation of Granular Materials," Annual Reviews Fluid Mech., 2000, pp. 55-91, Annual Reviews.

Burtally, N. et al., "Spontaneous Air-Driven Separation in Vertically Vibrated Fine Granular Mixtures," Science, Mar. 8, 2002, pp. 1877-1879, vol. 295.

McNamara, Sean et al., "Dynamics of a Freely Evolving, Two-Dimensional Granular Medium," Physical Review E, May 1996, pp. 5089-5100, The American Physical Society.

Rajchenback, Jean, "Granular Flows," Advances in Physics, 2000, pp. 229-256, vol. 49, No. 2, Taylor & Francis Ltd.

Knight, James B. et al., "Experimental Study of Granular Convection," Physical Review E, Nov. 1996, pp. 5726-5738, The American Physical Society.

Aoki, Keiko M. et al., "Convective Roll Patterns in Vertically Vibrated Beds of Granules," Physical Review E, Jul. 1996, pp. 874-883, vol. 54, No. 1, The American Physical Society.

Hsiau, S.S. et al., "Motion State Transitions in a Vibrated Granular Bed," Powder Technology 96, 1998, pp. 219-226, Elsevier Science S.A.

Jaeger, Heinrich M. et al., "Granular Solids, Liquids, and Gases," Reviews of Modern Physics, Oct. 1996, pp. 1259-1273, vol. 68, No. 4, The American Physical Society.

Faraday, M., "On a peculiar class of acoustical figures; and on certain forms assumed by groups of particles upon vibrating elastic surfaces," Philos. Trans. R. Soc. London (1831) 121:299-340.

Wassgren, C.R. et al., "Vertical vibration of a deep bed of granular material in a container," J. Appl. Mech. (1996) 63:712-719.

* cited by examiner

SEPARATION OF FINE GRANULAR MATERIALS

This application concerns the separation of fine granular mixtures that may occur when the grains are suitably vibrated within a fluid.

Separation of multi-particulate systems is an essential activity in the modern process industries. It is particularly important in mineral processing where high value materials are extracted in the presence of far lower value components such as silicates. Specialised methods for achieving this separation based on magnetic properties and electrical conductivity may be applicable in some cases. However, the majority of separation processes rely on differences in particle size, density, or mass, either through differential behaviour in air using cyclones or other inertial classifiers, or by behaviour in dense-phase systems such as fluidised beds. "Wet" methods such as hydro-cyclones, sedimentation or froth flotation may also be used.

However, all of these processes fail to produce a complete separation within a narrow property range, certainly within a single process stage. At present, the emphasis is often either on concentrating the desired component of the mixture to a level where it is economical to perform the remainder of the extraction using chemical means, or on removing as much of the desired material as is economic using a multi-stage system. The extra processing may incur appreciable costs and yet still involve considerable waste. At present the effectiveness of separation, particularly in a single process, falls considerably for particle sizes below about 100 μm for processing in air and about 50 μm for wet processing.

Granular materials occur widely in nature and the ability to handle grains and powders is central to numerous industrial processes (1, 2). The dynamics of large grains are influenced by the in-elastic nature of collisions (3); under vibration they may exhibit flow (4), convection (5, 6), arching (7, 8) and pattern formation (9, 10), while the "Brazil nut effect", in which a larger grain moves to the top of a collection of smaller grains of similar density (11), is well known. For diameters less than about 0.5 mm air plays an important role, leading to spontaneous "Faraday" heaping and tilting under vertical vibration (12).

The present invention is based on extensive research which brings together these two important aspects of granular dynamics; the effect of ambient fluid and granular separation.

Since the time of Faraday, vibration-induced air-flow has been known to influence the motion of fine particulates (13), the simplest manifestation being the spontaneous formation of heaps in vertically vibrated granular layers (14). However, to date, there is no general consensus on the detailed mechanism responsible for this instability (15-17).

Similarly, there is now a substantial body of knowledge on segregation and separation in granular composites (18), but a clear understanding of many of the physical processes involved is still lacking. Furthermore, much of the attention has been focused on large particulate systems for which fluid effects are unimportant.

While particles of relatively large sizes can be segregated according to density by flotation or cyclone methods, the separation of significantly smaller particles can be extremely difficult by previously known methods. The method and apparatus of this invention can give a rapid and efficient separation of different particle types.

It would be desirable to provide an efficient single stage process that is able to separate fine particulates. It would be further desirable to achieve high specificity in the separation of particulate materials. It would also be desirable to achieve separation at greater speeds than currently available.

It would further be desirable to achieve an efficient method of separation of particulate layers in a system whereby the particles have already been separated into strata.

According to a first aspect of the present invention there is provided a method of separating a particulate mixture comprising different particle types, comprising subjecting a supported particle bed comprising a fluid and said particulate mixture to a vibration thereby to effect separation of the particulate mixture into strata each of which is preferentially rich in substantially one particle type.

In a particularly preferred embodiment, fluid is driven through the particle bed concurrently with the application of the vibration. The fluid is preferably driven in phase with the vibration. Typically, the fluid is driven through the bed by the oscillatory movement of a surface supporting or bounding the particulate bed. By "driven" we mean that fluid is positively moved through the bed, not just that fluid is present.

In another particularly preferred embodiment, the particles from a strata formed by the method of the present invention may be extracted from the container by one or more extraction points. The extraction points may be disposed at different positions within the bed, the extraction preferably being effected by the application of a vibration to the particle bed.

Preferably, the particle types differ in that each particle type comprises particles having similar sizes and/or densities. More particularly, as between the different particle types, values of the expression $d^n \rho$ preferably differ significantly, where d is the mean diameter, n is approximately 2 ($\pm 0.5$), preferably 2, and $\rho$ the density of the particles of the respective different types. For example, $d^n \rho$ should preferably differ by at least 5%. Thus, a particular particle type may comprise a distribution of particle sizes, but the $d^n \rho$ distribution distinguishes different particle types. Strata are formed wherein a strata comprises particles of similar type, for example having a similar $d^n \rho$ value. Different strata are distinguished from one another in that they have substantially different particle types to other strata.

According to a further aspect, the present invention provides apparatus for separating a particulate mixture comprising particles of different types, wherein the apparatus comprises a support for the particulate mixture and a fluid medium, and a vibrator for subjecting the container to vibration, thereby to effect separation of the particulate mixture into strata each of which is preferentially rich in substantially one particle type.

The fluid medium is suitably a gas, preferably air. Separation in a gas is usually termed "dry separation". Separation may also be carried out under some other gas, for example, a substantially inert gas such as nitrogen if desired. Liquids may also be effectively used as the fluid. In particular, water has been used to good effect. Separation using a liquid as fluid is termed "wet separation". Preferably, the fluid substantially occupies the space between particles.

Preferably, the first and second types of particles are significantly differentially damped in their movement in a fluid. That is to say that the fluid in which the particles are vibrated damps the movement of one particle type to another particle type to significantly different levels. The effect of the damping force on a particle results from the interplay of the viscous damping force acting on the particle and the mass of the particle. A relatively large and heavy particle will be less damped in its motion than a relatively small and light particle.

Other embodiments of the invention provide that said fluid medium is a supercritical fluid. The use of a supercritical fluid allows the viscosity of the fluid medium to be altered from values typical of gases to values more typical of liquids.

The present invention affords particular advantages in the separation of particles of different densities that have substantially the same granulometry. This is thought to be of particular value in mineral separation, especially in the extraction of the chemically less active metals which occur in the metallic state. Ore containing such metals, e.g. platinum, iridium, may be finely crushed, possibly screened, and then separated according to the invention. The high density metal will readily separate from the lower density ground rock.

When we speak of the density of a particle or particle type, we denote the actual density of that particle or the particles making up that type, and not the bulk density of the type. When we speak of the diameter of a particle, we refer to the mean size of the particles making up the particle type. For example, we can denote the mesh size of the smallest screen through which that particle will pass. We shall also refer to a $G_{50}$ grain size which is the mesh size of a screen through which will pass 50% by mass of the particle type under consideration. Thus, particle types generally exist as phases of similar particles and such phases will be termed types hereinafter. Indeed, in a system with a number of different particle sizes and/or densities, there may exist a plurality of strata or pseudo strata; in effect a rainbow of different layers comprising similar particle types. In excess of two particle types may be resolved by the present invention. For example, 3, 4, 5 and more particle types may be separated effectively and efficiently.

For dry separation, the invention has advantages in the separation of particles having a $G_{50}$ grain size of less than 500 µm, preferably less than 350 µm. Once the grain size of the particles reaches more than 500 µm, the efficacy of the process drops and the tendency to separate diminishes.

At small particle sizes, for example, particles of less than 100 µm in diameter, the method of the present in invention has particular advantages over other separation methods such as sieves. Sieves tend to block at these lower particle sizes.

Operation of the invention for dry separation is especially effective when said particles have a $G_{50}$ grain size between 10 µm and 250 µm, and the advantages afforded by the invention are especially evident when the $G_{50}$ grain size of the particles is below 150 µm, most preferably below 100 µm, since it is in that range of grain sizes that previously known methods of separation have been found wanting.

For wet separation, the invention has advantages in the separation of particles having a $G_{50}$ grain size of less than 3 mm, preferably less than 2 mm. Operation of the invention for wet separation is especially effective when said particles have a $G_{50}$ grain size between 10 µm and 1 mm.

It will be appreciated that due to the viscosity of liquids as compared to gases, a liquid may be used to achieve different damping effects to gases.

In a most preferred embodiment, as between the different particle types, values of the expression $d^n\rho$ differ by at least 10%, preferably at least 20%, more preferably 30%, where d is the mean diameter, n is approximately 2, and $\rho$ the density of the particles of the respective different types. Such particle types are readily separated by the present invention. Where values of the expression $d^n\rho$ differ by more than 30%, the mixtures become increasingly easy to separate.

There may be a plurality of different particle types present in the mixture. Although the invention will work with a large number of different particle types, it is preferred to minimise the number of different types in order to enable a simpler and more efficient extraction of different types from the separated particulate mixture. To this end, the particulate mixtures used in method of the present invention may be subjected to an initial screening process to minimise the number of particle types present. However, the process of the present invention is essentially a single stage process that provides clear advantages over the convoluted and multi-stage processes of the prior art.

The vibration applied to the particle bed is preferably in the range of 3-500 Hz, more preferably 10-200 Hz, most preferably 30-80 Hz.

In one preferred embodiment, the vibration has a resolved amplitude in the vertical or horizontal direction in the range of 90-100% of the vibrational amplitude, more preferably greater than 95% of the vibrational amplitude, most preferably greater than 98% of the vibrational amplitude.

Vibrations may be applied in conditions of reduced gravity, for example zero gravity.

The type of vibrational waveform applied to the particle bed is of importance. Typical tests have been done with sinusoidal waveforms, but it has been observed that if non-sinusoidal vertical oscillations are used, unwanted effects may be controlled.

In some embodiments of the present invention, for example the partially filled container discussed below, having separated the mixture into strata, horizontal vibrations may be applied to cause the bed to acquire a particular configuration.

The vibration preferably substantially fluidizes the particulate bed. Preferably the vibration forces fluid through the bed during the application of vibration. It is postulated that separation is effected as a result of viscous fluid force acting differentially on the various particles. Thus, types of particles that are sufficiently distinct in their interaction with the fluid may be separated from one another.

The present invention can achieve above 90% separation in about a second for certain idealised particle types, for example relatively smooth, substantially spherical particles. Depending on the separation parameters, in the order of 98% separation can be achieved in the order of 1-2 minutes, for less ideal particle mixtures, such as coal and sand.

In a preferred embodiment of the invention, $\Gamma$ is preferably at least 2. $\Gamma$ is the ratio of the maximum acceleration of the container to the acceleration due to gravity and is given by $\Gamma=A\omega^2/g$ where A is the amplitude of the oscillation, g is the standard acceleration due to gravity and $\omega=2\pi f$ where f is the frequency of vibration.

The invention is most preferably operated so that the frequency and amplification of the vibration applied are controlled to give rise to a substantially stable stratification of different types of the particulate mixture. The control of vibrational parameters may be effected by manual or automated means, for example, by computer program. Alternatively, or in addition, the waveform of the vertical vibration applied is controlled, and/or a horizontal component of vibration is applied to stabilise stratification of separated particulate types. This also simplifies selective extraction of separated types of particles.

If periodic, the form of the vibration may be sinusoidal or it may be of a more general form. The latter may have advantages in one or more of the following: in increasing the effectiveness of separation; in reducing the number of separated bands; in conveniently positioning the separated regions.

Relatively low frequency and high frequency vibration, as will be discussed below, can lead to differing stratification of the particle mixture. For a system having two discrete types of particles, high frequency may produce a band of one type of particle sandwiched between layers of another type of particles. For low frequency vibration there may just two discrete layers of different particulate types. This phenomena is discussed in more detail below.

The present invention works less effectively if the proportion of one type of particles to the other type of particles is too low. In order to overcome this problem, carrier particles may be introduced. The carrier particles are selected to have about the same size and/or density as the low proportion of particles. More particularly, the carrier particles are preferably selected to have about the same $d''\rho$ value as the type of particles in the mixture which one wishes to extract. This adds "body" to the amount of particles that are present in only a low concentration. It is then possible to separate the particles more efficiently, some of which are the target particles and others of which are the "carrier" particles. Carrier particles are selected to be easily separated from the target particles. For example, by having magnetic carrier particles a magnet may be used to separate target from carrier particles. However, any suitable method for separation of target and carrier particles may be employed. For example, dissolution, flotation and the like. Additionally, a solid lubricant may be added to the mixture to aid in the separation.

Particles may be separated in a batch process, or a continuous process. Indeed, the present invention finds particular utility in continuous processing as described below.

The separation apparatus comprise a number of components. The vibration of the particle bed is preferably carried out on a support. The support is preferably a container. The support may be made from any suitable material. Preferably, the particle bed is caused to vibrate by placing them on a support or retaining them in a container and vibrating the support or container.

Where a container is used, it is preferably box shaped, and may be square or rectangular. Alternatively, the container may be cylindrical. Preferably the base and walls of the container are substantially parallel or perpendicular to the axis of vibration. For example, where the vibration has a predominant resolved vertical component, the base of the container upon which the particle bed lies, is preferably substantially perpendicular to the vibration. Alternatively, if the vibration has a predominant resolved horizontal component, the base of the container upon which the particle bed lies, is substantially parallel to the vibration.

The dimensions of the container are not crucial and may be adjusted to the type and scale of the material requiring separation. Preferably, where separation is carried out under substantially vertical vibration, the container is a box shape, having a greater height than width. Preferably, the container has a significantly higher height than width, for example, the aspect ratio of the container may be greater than 2:1, 3:1 or 5:1. Conversely, where separation is carried out under substantially horizontal vibration, the container is a box shape, having a greater width than height. Again aspect ratios of 2:1, 3:1 or 5:1 or greater are envisaged.

The container preferably comprises a sensor for determining the amount of particulate matter in the container. This may be a weight or volume detector. Alternatively, or in addition, the container may be provided with a transparent section that allows an operator to determine the level of particulate mixture in the container and/or where different strata are located. Preferably, there are means provided for determining flow rates of particulate matter into and/or out of the container. Sensors may also be provided to determine to what extent separation of the mixture is resolved.

A sensor may also be used to control the supply and/or extraction of particles to and/or from the container.

The vibration may be effected by any suitable means, preferably an electromechanical vibrator, for example, a loudspeaker, a cam-bearing driven shaft or a hydraulic vibrator. Preferably, the vibrator comprises frequency and/or amplification controls for controlling the vibrational parameters of the vibrator. The controls may be manually operated or automated.

The vibrator may be linked to a signal generator, the signal of which may be amplified before it is applied to the vibrator. The vibrator may be controlled by a manual control input device, or an automated control device.

The control device preferably comprises means for controlling vibrational parameters, such as the frequency, resolution of vibration in a particular direction, amplitude and the like. These may be influenced directly by an operator or may be controlled by a processor which analyses feed back information from sensors in the separation apparatus and controls the apparatus under the direction of a program.

It is observed that if a conduit, preferably a tube or pipe, is inserted into the particulate bed, with the open end of the conduit at a particular layer/region where particles have achieved separation, the separated particles may flow along the conduit and out of the end—above the level of the top of the surface of the particle bed in the case of vertical vibrations and a vertical conduit. This phenomena is maximised when where the longitudinal axis of the conduit inserted into the mixture is substantially parallel to the direction of vibration applied to the mixture. For example, where the vibration has a predominantly vertical resolved component of vibration, mixture will flow up a conduit placed with its longitudinal axis inserted substantially vertically into the mixture. Similarly, where the vibration has a predominantly horizontal resolved component of vibration, mixture will flow along a conduit placed with its longitudinal axis inserted substantially horizontally into the mixture. Thus it is possible to have two conduits inserted into a mixture, with their ends disposed at different material layers, so that one conduit conveys the separated first type of particles, and another conveys the separated second type of particles. The particle bed may be replenished with mixed material. By controlling the diameters of the conduits and/or providing valve controls it is possible to control the flow rates so that the container does not overflow when a continuous process is achieved. This effect could be termed vibration induced particulate syphoning. The separated types may then be conveyed for further processing.

Instead of, or in addition to, using this vibrational effect to extract material from a layer a particulate type may be drawn off from said vessel by more conventional means, for example, a screw feed mechanism or by aspiration.

While vibration at any angle from vertical to horizontal in envisaged, it is preferred that the particles are bounded by one or more walls that are generally, preferably substantially perpendicular to the direction of vibration.

Where vibration-separation of particles of the same density is required, for example, small pharmaceutical crystals from large pharmaceutical crystals, vibration can readily separate particles with percent differences in size, for example, 30%, 50% or 100% is readily separable.

It is preferable to avoid the build up of static electricity which may occur in some circumstances. This may be achieved by vibrating for a limited period of time. Having a continual bleed of material away from the vibrating container is also preferable. This aids in dissipating static electricity. The material of the container may be chosen to minimise static electricity. An anti-static aid may be added to the particle-fluid system.

A surfactant may be added to a liquid system, for example water, to remove the tendency for the particles to flocculate. This tendency is more pronounced at lower particle sizes. Alternatively, or in addition, surfactant may be added to the system as a wetting aid.

In a particularly preferred embodiment, the container is partially filled. "Partially filled" means 90% of capacity or less. Preferably, the container is filled in the range of 25-75% of capacity. For a partially filled box, the vibration may, for an especially advantageous embodiment, be substantially vertically resolved. The vibration may be sinusoidal and the spatial form of the separation depends upon both angular frequency, $\omega=2\pi f$, and the amplitude of vibration A, conveniently expressed as $\Gamma=A\omega^2/g$, where g is the acceleration due to gravity. For dry separation there exists a low frequency form of separation in which the less fluid damped components are found above the more fluid damped components. There exists a high frequency form of separation in which the less fluid damped components are found as a sandwich between layers of the more fluid damped components. The regions for which these different behaviours are found may be determined by experiment. These phenomena are discussed in greater detail below. Optimal separation may be obtained by following a particular path within the $\omega$ and $\Gamma$ plane. There is also advantage in using a non-sinusoidal vibration, both in terms of quality of separation and in terms of controlling the stability of the separation boundaries between the separated components. For wet separation there exists a low frequency form of separation in which the less fluid damped component is found above the more fluid damped component.

The Faraday effect, which is well documented, is the way vertical vibrations of particles in a box create a sloping surface on the top of the particles. For a part filled container, this usually occurs in the lower frequency domain. At some low frequencies, oscillations may occur between the alternative tilts of the bed. There may be some applications where such oscillatory tilting is not desired. To remedy this situation, it is possible to have a substantially vertical-only vibration at one time, or for a first period of time (which may experience Faraday tilting of the bed surface), and to introduce a horizontal component of vibration at a second time, or for a second period of time, in order to manipulate the bed into a desired configuration. The application of controlling vibration may be constant or interrupted, preferably constant. We have discovered that the introduction of a transverse component to the vibration enables us to control the movement of the surface of the bed. In one embodiment, faster separation is achieved with a substantially vertical only vibration and then the surface of the bed is controlled by introducing a horizontal component to the vibration subsequently.

In a further particularly preferred embodiment, the container may be substantially filled with the mixture. This type of separation requires the container to be filled so that at the value of $\Gamma$ applied, the grains impact both the upper and lower surfaces of the container. The more vigorously the vibrations are applied (higher $\Gamma$) the more acceleration from the vibrations predominate over gravity. However, the container must not be filled to an extent which impairs fluidization. "Filled" means greater than 90% of capacity. For example, the container is preferably filled in excess of the 92%, preferably 95%, most preferably 98% of capacity. For a "filled" box, the vibration may be substantially vertically resolved. For sinusoidal vibration the spatial form of the separation depends upon both angular frequency, $\omega=2\pi f$, as defined above. The usual form of separation is then as a series of bands. These reduce in number as the vibration is continued until a single sandwich occurs. This form of separation is found over a wide range of frequencies. The separation may occur as a single region of each class of grains if a non-sinusoidal vibration is applied.

In yet a further preferred embodiment, the direction of the vibration may be horizontal or close to horizontal. For this embodiment, the container must then be "filled" as described above. For example, the container is preferably filled in excess of the 92% capacity, more preferably 95%, most preferably 98% capacity. This allows the granular mixture to be separated in such a way that the fluid is forced through the granular bed by the vibration. For this type of separation the vibration is applied horizontally and the container should be filled so that, at the value of $\Gamma$ used for the separation, the granular bed fills the container by fluidization, thus forcing the fluid through the bed during each vibratory cycle. The usual form of separation is then as a series of bands which reduce in number as the vibration is continued until a single sandwich occurs. This form of separation is found over a wide range of frequencies.

The separation may occur as a single region of each class of grains if a non-sinusoidal vibration is applied.

In order to illustrate the invention, certain processes will now be described by way of example only and with reference to the accompanying drawings in which:

FIG. 1 shows a view of the experimental apparatus showing a glass box and box mount (a), an accelerometer (b), two electromagnetic transducers (c) and a connecting frame (d).

Figure 2:
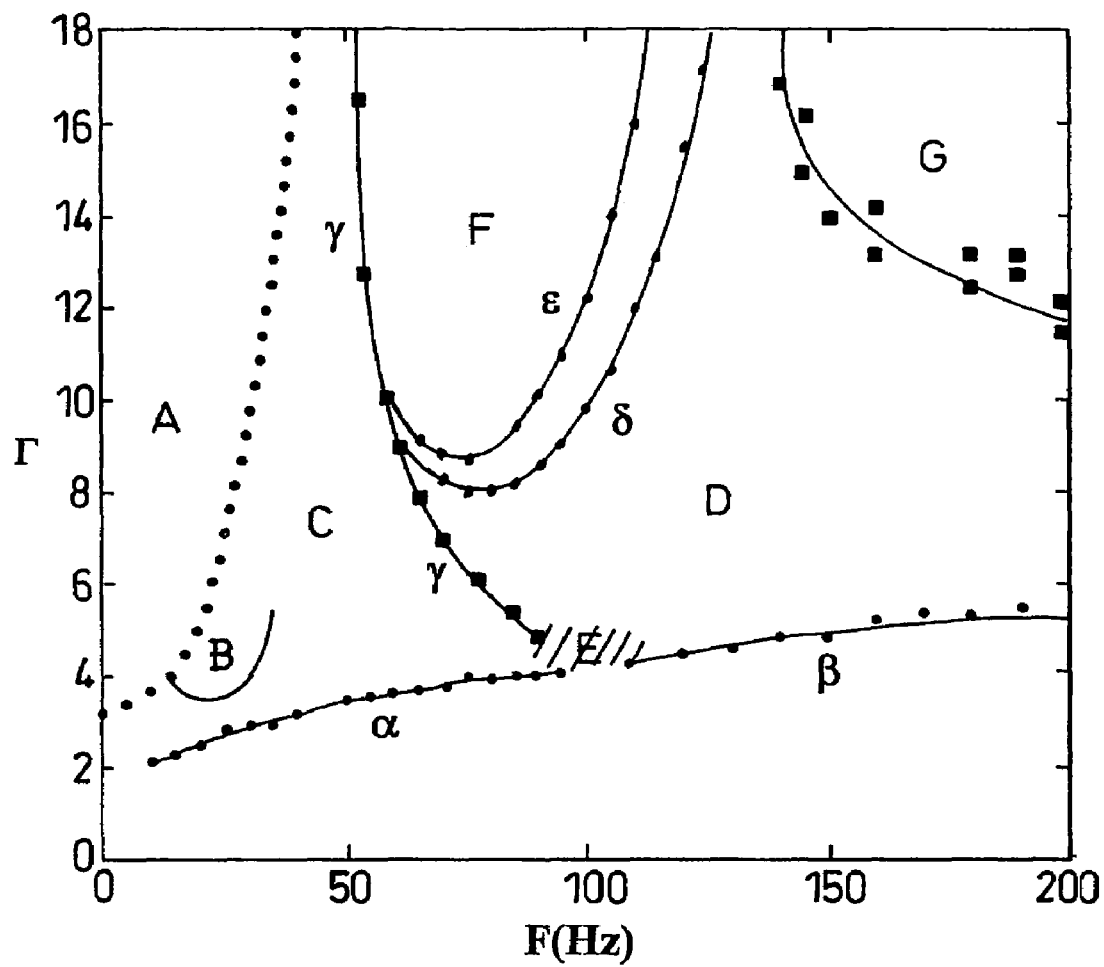

FIG. 2 shows the behaviour of mixture A1, as a function of frequency and $\Gamma$, showing the onset of "bronze on top" ($\alpha$), the onset of sandwich separation ($\beta$), a transition boundary between the two ($\gamma$), and the onset of slow ($\delta$) and rapid ($\epsilon$) inversion oscillations of a first kind. Also shown are the regions of "bronze on top" (C), violent thrashing and throwing (A), simple tilt oscillations (B), sandwich configuration (D), oscillations between "bronze on top" and the sandwich configuration (E), continuous inversion oscillations of the first kind (F), and continuous inversion oscillations of a second kind (G).

Figure 3:
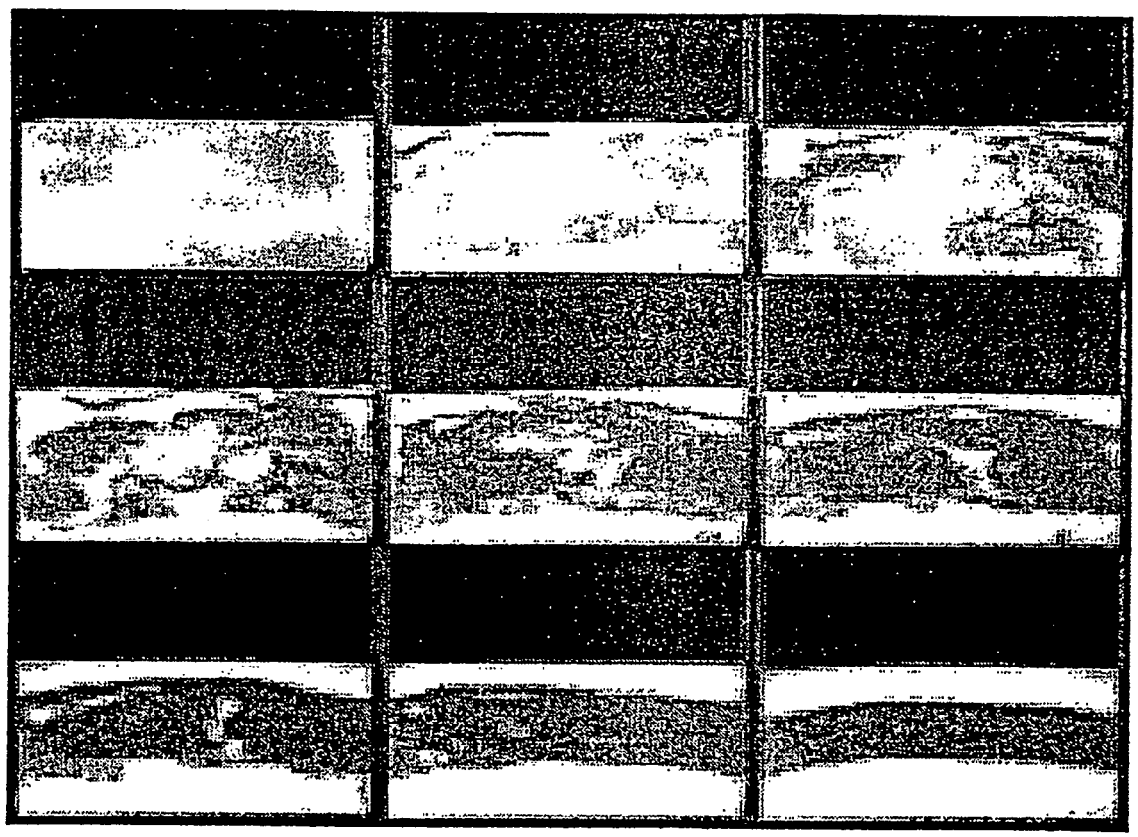

FIG. 3 shows the behaviour of mixture A1 under $\Gamma=6.8$ at 160 Hz showing the formation of the sandwich configuration. The pictures form a time sequence from upper left to lower right. The fifth picture was taken after 50 s and the ninth picture after 7 mins. The bronze-rich region appears dark-gray, while the glass appears white.

Figure 4:
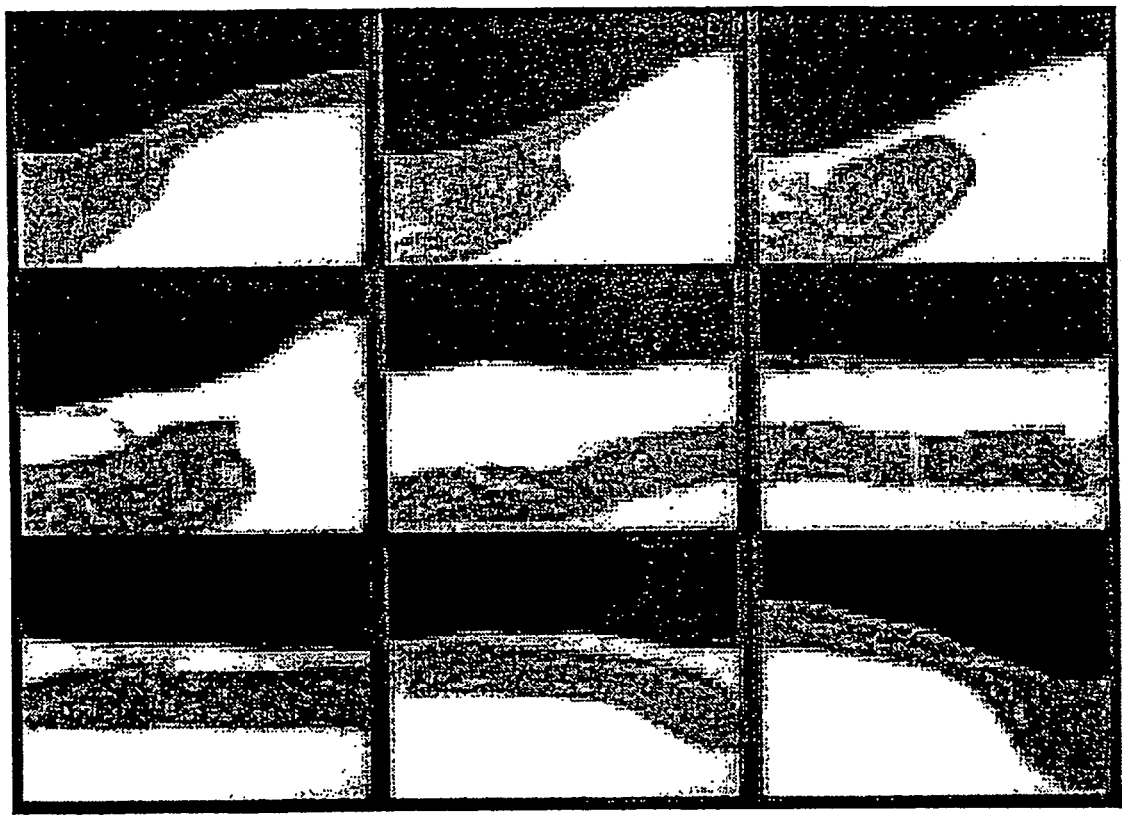

FIG. 4 shows the behaviour of mixture A1 under $\Gamma=16.7$ at 70 Hz showing one half period of a continuous inversion oscillation of the first kind. The pictures form a time sequence from upper left to lower right. The time period of full oscillation is 30 s.

Figure 5:

FIG. 5 shows the behaviour of mixture A1 under $\Gamma=16$ at 70 Hz showing part of a continuous inversion oscillation of the second kind. The pictures form a time sequence from upper left to lower right. The time period of full oscillation is 37 s. Note the formation of a number of small bronze fragments, which stay intact, later joining the main body of bronze.

Figure 6:
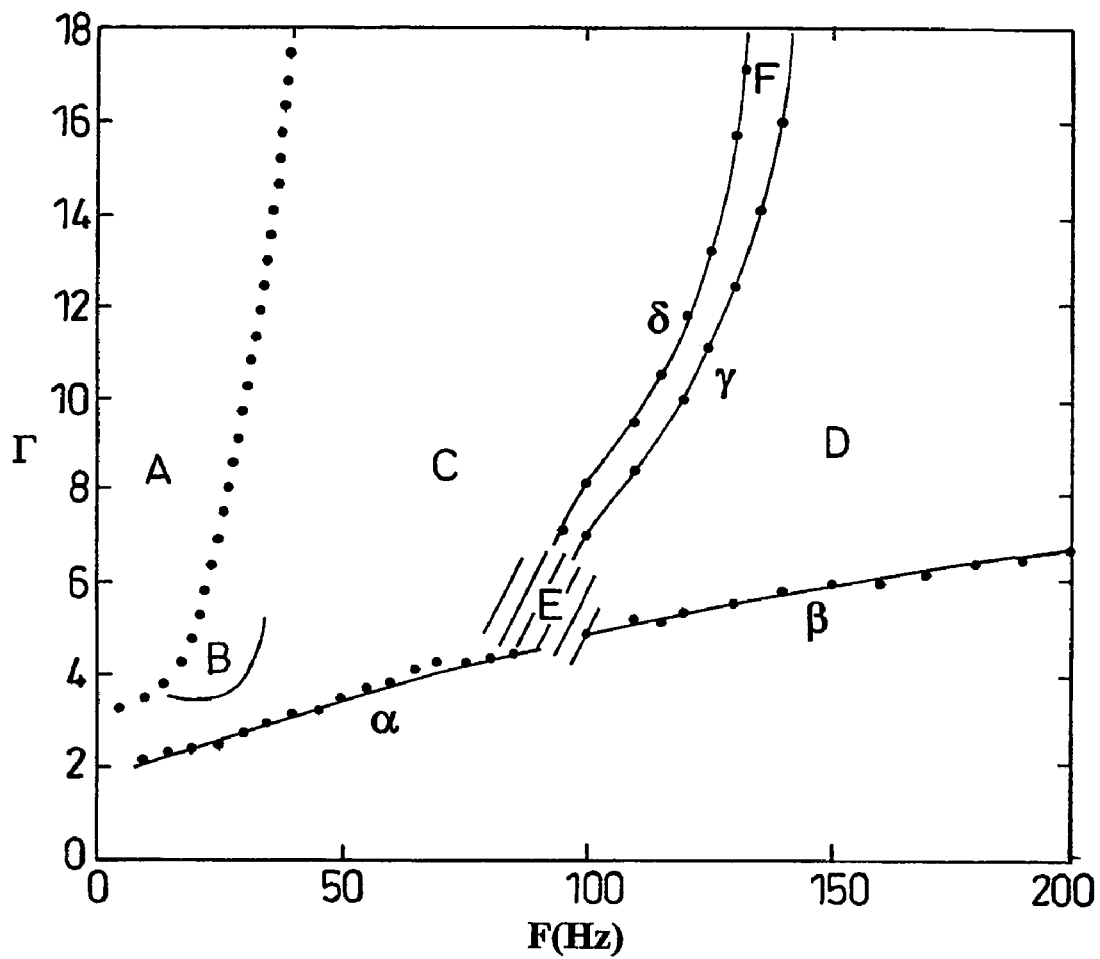

FIG. 6 shows the behaviour of mixture A2, as a function of frequency and $\Gamma$, showing the onset of "bronze on top" ($\alpha$), the onset of sandwich separation ($\beta$) and the transition between the two ($\gamma$ and $\delta$). Also shown are the regions of "bronze on top" (C), violent thrashing and throwing (A), simple tilt oscillations (B), sandwich formation (D) and oscillations between "bronze on top" and tilt (E). The pseudo-sandwich zone between the lines $\delta$ and $\gamma$ is indicted as F.

Figure 7:
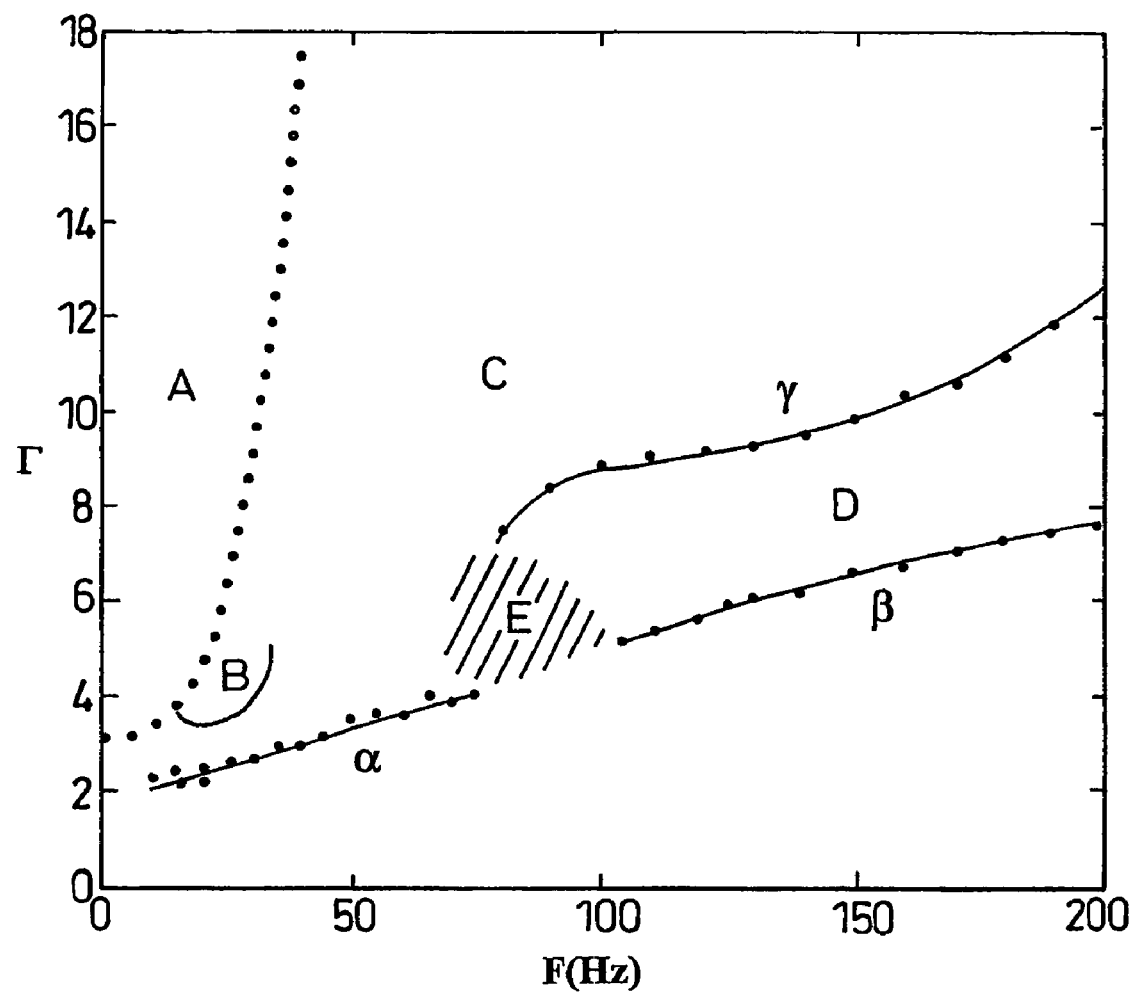

FIG. 7 shows the behaviour of mixture A3, as a function of frequency and $\Gamma$, showing the onset of "bronze on top" ($\alpha$), the onset of pseudo-sandwich separation ($\beta$) and the transition boundary between the two (γ). Also shown are the regions of "bronze on top" (C), violent thrashing and throwing (A), simple tilt oscillations (B), and the pseudo-sandwich configuration (D). Oscillations between "bronze on top" and the pseudo-sandwich configuration occur at E.

Figure 8:
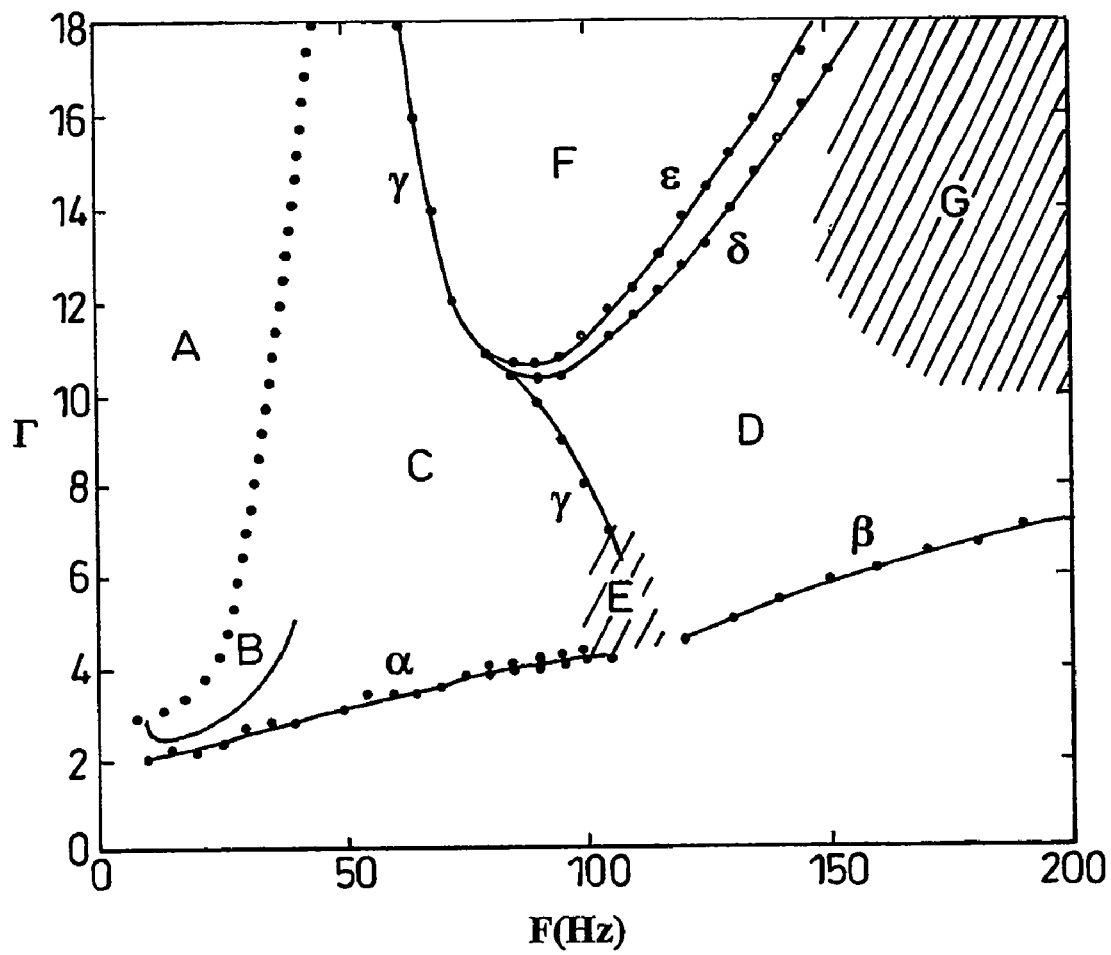

FIG. 8 shows the behaviour of mixture B1, as a function of frequency and Γ, showing the onset of "bronze on top" (α), the onset of sandwich separation (β) the transition boundary between the two (γ), and the onset of slow (δ) and rapid (ε) inversion oscillations of the first kind. Also shown are the regions of "bronze on top" (C), violent thrashing and throwing (A), simple tilt oscillations (B), the sandwich configuration (D), oscillations between "bronze on top" and the sandwich configuration (E) and continuous inversion oscillations of the first find (F). In the zone G phenomena similar to continuous inversion oscillations of the second kind occur very sporadically.

FIGS. 9 to 12 show various examples of a particle separation apparatus.

EXAMPLES

The experiments described use bronze spheres of density $\rho_b=8900$ kg/m$^3$ and soda-glass spheres of density $\rho_g=2500$ kg/m$^3$. The dynamic angles of repose lie within $23.4°\pm0.8°$ and $23.9°\pm0.8°$ for the glass and bronze spheres respectively. The elastic properties have been studied by vibrating glass and bronze spheres in a glass box under vacuum, at velocities comparable to those in the present experiments. The coefficients of restitution appear to be comparable and close to unity.

Spheres of closely similar sizes often form close packed crystalline structures under vibration, with bulk movement of a whole crystalline block rather than independent movement of individual grains. The glass and bronze spheres are therefore sieved to produce a size-spread in order to avoid crystallisation effects.

We have studied four ratios of the mean diameters. Mixtures A consist of bronze spheres with diameters in the range 125-150 μm and glass spheres with diameters in the range 63-90 μm. Mixtures B consist of bronze in the range 90-125 μm and glass in the range 90-125 μm. Mixtures C consists of bronze in the range 63-90 μm and glass in the range 125-150 μm, while mixtures D consist of bronze in the range 45-53 μm and glass in the range 125-150 μm. For each class of mixture we have studied volume ratios of the bronze to glass components of 25%:75% (referred to as 1), a 50%:50% mix (referred to as 2) and a 75%:25% mix (referred to as 3).

A chosen mixture, of mean depth 20 mm, is contained within a rectangular soda-glass box 50 mm high. Internal dimensions of 40 mm times 10 mm in the horizontal plane have been used unless otherwise noted. The boxes are vibrated using the arrangement shown in FIG. 1. The glass box is glued to a metal mount which is bolted to a rigid frame held between a pair of electromagnetic transducers. The transducer assembly is attached to a massive concrete block (approx 250 kg). This configuration ensures accurate one dimensional motion over the frequency range of interest (10 Hz<f<200 Hz), the axis of vibration being aligned to the vertical to within 0.2°. The vertical motion is monitored with a pair of capacitance cantilever accelerometers, covering the ranges 0-8 g, and 0-80 g. The waveform of the vibration is monitored on an oscilloscope.

Persistently shaken fine glass spheres develop static charge. They may then stick to the walls, impairing photography. If very vigorous shaking is continued for some time, the build up of charge eventually begins to affect the granular dynamics, slowing the progress of many of the phenomena which we will describe. The addition of minute quantities of an anti-static surfactant slows the build up of static without appreciably influencing the dynamics. However, in the present studies, we have preferred to replace the mixture being studied with a freshly prepared one, should appreciable static effects become evident.

Varying the Composition

The effect of varying the bronze/glass composition is studied by comparing and contrasting the behaviour of mixtures A1, A2 and A3, where the bronze and glass diameters are 125-150 μm and 63-90 μm and the bronze percentages by volume are 25%, 50% and 75% respectively. An outline of the behaviours observed for mixture A1 as a function of f and Γ is shown schematically in FIG. 2. The data points have been obtained by slowly increasing Γ at a number of fixed frequencies, starting from a well mixed state.

At lower frequencies global convection and tilting of the upper surface are observed as the amplitude of vibration is increased. At the line shown in FIG. 1 as α, sharp separation boundaries quickly appear between glass-rich and bronze-rich regions. The bronze-rich regions rapidly merge into a single upper bronze-rich "phase" which lies above a lower glass-rich "phase", the "bronze on top" configuration. The boundary between phases is extremely well defined, being only one grain-diameter wide. Development towards a single upper bronze-rich region occurs by coarsening, an effect observed in other granular systems. Eventually, the bronze-rich phase contains a small proportion of glass, estimated by visual inspection, following the cessation of vibration, to lie in the range 2-20% depending upon f and Γ, while the lower region consists almost entirely of glass.

In the "bronze on top" configuration, convection currents occur within the individual bronze and glass-rich regions but they do not act to cause mixing. Above α, in the "bronze on top" regions A and C both the separation boundary and the upper surface exhibit wave-like fluctuations. At low values of Γ and f, in the region B in FIG. 2, simple oscillations back and forth between the two alternative tilts occur. At higher values of Γ the fluctuations contain both periodic and non-periodic components. For values of Γ corresponding to region A, considerable "writhing" of the interface between the glass and bronze-rich regions is observed together with writhing and throwing of the upper surface. Surprisingly, a sharp separation boundary between distinct phases is maintained despite these disturbances. However, in the higher parts of region A the writhing and throwing becomes so severe that glass breaks through the upper bronze layer. Partial separation is still maintained, with a sharp separation boundary, but the bronze-rich region now contains a higher proportion of glass.

At higher frequencies there is also a line at which sharp separation boundaries between a bronze-rich phase and a glass-rich phase appear, β in FIG. 2. Here, however, the bronze-rich regions rapidly merge to form a stable single layer at an intermediate height, between upper and lower glass-rich regions. This we refer to as the sandwich configuration. The upper surface of a sandwich is close to horizontal. Again, the bronze-rich layer contains a proportion of glass but the glass-rich regions are almost completely free of bronze. The formation of a sandwich configuration is illustrated in FIG. 3. Bronze concentrates in the region of what will become the "sandwich filling". In the early stages this region also contains pockets rich in glass but they are then ejected as the sandwich develops. In the sandwich region the glass phase is eventually almost pure glass while the bronze-rich phase contains 4-20% of glass depending upon f and Γ.

In the sandwich regime, D, and for some higher values of Γ, the formation of glass "rain-drops" may be observed within the bronze-rich layer. These drops then either fall into the lower glass layer or rise to join the upper glass layer. It appears that some glass is continually but slowly passing into the bronze-rich layer and that this process of droplets rising or falling maintains equilibrium.

In the region E, where lines α and β meet, the formation of glass-rich and bronze-rich regions involves complex oscillations between the "bronze on top" configuration of region C and the sandwich configuration of region D.

The position of the lines α and β depends somewhat upon the time scale of measurement. α and β have been chosen to correspond to the formation of sharp separation boundaries and the substantial completion of separation into distinct glass-rich and bronze-rich phases after about 2 minutes. If Γ is lowered by 10% the formation takes very many minutes, while at 10% higher the, separation is substantially complete in much less than one minute.

Following separation, convection may be observed within the individual glass and bronze-rich regions, with considerable velocity shear at the sharp separation boundaries but no convection currents are present which would mix the two phases. In region C tilted configurations are often found where this shear is particularly evident, since the bronze-rich and glass-rich regions then have convection currents in the same sense. Both at low and at high frequencies, we observe considerably more kinetic activity in the bronze-rich phase than in the glass-rich phase with correspondingly greater speeds of convection in the former.

The boundary between the "bronze on top" region, C, and the sandwich region, D, is shown as the line γ. As this line is approached from below or from the left the upper bronze layer avalanches down the tilted slope and passes into the depths as a cylindrical roll, then spreading out to form a sandwich between upper and lower glass-rich layers. We refer to this process as an inversion. At no stage are the sharp separation boundaries between the two phases lost. If the line γ is approached from the right the sandwich configuration slowly changes to the "bronze on top" configuration, unaided by an inversion. Rather the configuration transforms continuously by the glass diffusing from the upper glass layer through the bronze-rich region into the lower glass layer. At lower values of Γ this can take a very long time indeed.

In the region indicated as F the inversion process repeats continuously. One half period of such a process is shown in FIG. 4. Upon entering F from the region C the bronze-rich layer of the sandwich rises slowly to the surface, while remaining close to horizontal. Once there, the surface tilts. The bronze then avalanches down the slope, and passes into the depths of the glass to form a stable low-lying horizontal layer. The bronze then slowly rises to the surface again and the process is repeated. We describe this behaviour as a continuous inversion of the first kind. At the line marked δ the period of this repeating process is many minutes, while by the line ε the period has fallen to about one minute.

Within the region G an alternative type of oscillation is found, continuous inversions of the second kind. Such a process is shown in FIG. 5. The bronze layer moves towards the upper surface of the bed, but before it reaches the upper surface it necks and divides in the middle. Glass thrusts upwards through the gap, the two bronze regions passing down the right and left sides of the box to reform a single sandwich layer low in the bed. During this process the main bodies of bronze shed a number of small fragments. Each of these sharp boundaried fragments remains intact, eventually joining the single sandwich layer. This single horizontal layer then slowly moves to the surface and the process repeats. The onset of this oscillation is somewhat erratic and we find difficulty in determining the boundaries to this form of behaviour.

An outline of the behaviour of mixture A2 as a function of f and Γ is shown schematically in FIG. 6. Again, the data shown have been obtained by slowly increasing Γ at fixed frequencies, starting from a well mixed state. As with mixture A1, at low frequencies we observe the onset of separation into a "bronze on top" configuration, at the line marked α At higher frequencies we observe separation into the sandwich configuration, the onset occurring at the line β. At the intersection of the α and β lines there is a small region marked E at which complicated oscillations between the "bronze on top" and the sandwich configurations occur. We note in FIG. 6 the region A in which active writhing of the separation interface and violent throwing of the upper surface occurs. However, for this mixture composition the bronze-rich region remains uppermost, despite the activity. Simple tilt oscillations occur in region B. The boundary between the extensive "bronze on top" region, C, and the sandwich region, D, is also shown. As Γ is slowly increased at intermediate frequencies, above the β line, the top layer of the sandwich thins by the diffusion of glass through the central bronze layer. Eventually the upper layer fails to cover the bronze layer completely, by the line γ. We refer to this configuration as a "pseudo-sandwich". For sufficiently high Γ the upper glass withdraws completely and the "bronze-on top" configuration is found, at the line δ. These processes are very slow and very many minutes must be allowed for each measurement. If the upper surface is symmetrically domed due to twin convection cells, an arrangement often found at higher frequencies, the pseudo-sandwich will have glass both at the right and left-hand extremes of the box. Pseudo-sandwiches also occur when the upper surface is tilted. Glass may then be found only at either the upper or the lower regions of the slope. For mixture A2 the tilted configuration is found close to region E while at higher frequencies the symmetrical configuration is preferred.

For mixture A2 we find no inversion oscillations. If Γ is kept constant while f is varied to take the system between region C and D the process of transformation between the "bronze on top" and sandwich configurations is very slow and the behaviour is hysteretic even when observed on time scales of minutes.

The equivalent information for mixture A3 is shown in FIG. 7. Once again we observe the formation of the "bronze on top" configuration at the line α. No failure of separation occurs in region A. For A3 we observe no full sandwich formation, rather the onset of a region of symmetric pseudo-sandwich formation at the line β. Complicated oscillations involving the two configurations occur at the intermediary region E. As Γ is increased above the line β, the upper glass regions of the pseudo-sandwich retreat, the full "bronze on top" configuration being recovered by the line γ. We observe no inversion processes anywhere in the f-Γ plane, transformations of configuration occurring by the slow diffusion of glass through the bronze-rich layer.

In all of the experiments within the 10 mm×40 mm box the principle separation features are close to two dimensional, the configuration of the bronze-rich and glass-rich regions being very similar when viewed through the opposite large faces of the box.

In comparing the behaviours of A1, A2 and A3, we note the following. All mixtures exhibit excellent separation with extremely sharp separation boundaries. The onset of separation with increasing Γ occurs at lines a and β which rise only slightly in Γ as the bronze proportion is increased. The interface region between α and β occurs at systematically lower frequencies as the bronze proportion is increased. At the same time the region of "bronze on top" behaviour increases, the region of sandwich behaviour found in A1 withdrawing to a restricted area of pseudo-sandwich behaviour by A3.

We note that inversion processes only occur for bronze-poor mixtures, such as A1. More usually, a new configuration of the bronze-rich and glass-rich regions occurs by the slow process of diffusion. If similar experiments are repeated in boxes having a squarer cross-section very similar processes of separation into "bronze on top", sandwich or pseudo-sandwich configuration occur. However, inversion operations are effectively suppressed by the use of a 10 mm×10 mm box. Restricting the box dimension in this way also suppresses tilt oscillations.

The data points in FIGS. 2, 6 and 7 are each for a particular sample of that composition. The onset lines α and β do not vary greatly with composition, while the upper structures of FIGS. 2, 6 and 7 change greatly with composition. This behaviour is reflected in the variation of our data between samples of the same nominal composition. While the onset lines α and β are reproducible from sample to sample to within about ±5% in Γ, there is considerably more variation of the upper lines. The boundaries of the region F of FIG. 2 for example show larger variations of behaviour from sample to sample. The lower limit of the region F of freshly prepared samples of mixture A1 measured on a time scale of some minutes varies from Γ=8 to about Γ=11. This almost certainly reflects variations in composition. While we have sieved the samples to have sizes within certain limits, we have not controlled the distribution of sizes between these limits.

Variation of Size Ratio

If differential air damping is the dominant separation mechanism, one would expect separation for some size ratios of the two components and not for others. For a mixture of bronze and glass particles of densities $\rho_b$ and $\rho_g$ and mean diameters $d_b$ and $d_g$ respectively, a simple dynamical model based on Stokes' law suggests that the relative strength of the air-effects on the two components may be characterised by the ratio $S=(\rho_b d^2_b)/(\rho_g d^2_g)$.

We now compare the behaviours of four types of mixture having different values of this parameter S.

For the mixtures A1, A2 and A3 which we have just discussed S=12, the glass component being far more heavily damped. The separation displays sharp boundaries with clear regions of "bronze on top", sandwich and pseudo-sandwich behaviour.

The mixtures B have S=3.6, the glass component being appreciably more damped by the air. Preliminary data for mixture of composition B1 has already been reported by Burtally et al [19]. FIG. 8 shows the results of a more detailed study using the same time-scale criteria as those used above.

There are many similarities to the data for A1. The separation lines, α, for "bronze on top" and β for sandwich formation again appear, as does the line γ at which transformation between the two configurations occurs by inversion when approaching from below or from the left. Failure of separation may occur in the upper parts of region A. The region F is one of continuous inversions of the first kind. However, the region of continuous inversion oscillations of the second kind found at very high f and Γ for A1 is even harder to define for B1, where the onset of very ragged and far from symmetrical inversions happens on a very erratic and delayed basis within the region G.

The behaviour of mixture A2 has many similarities to that of B2. Sandwich behaviour is now found over a limited range of Γ at higher frequencies, the transformation into "bronze on top" as Γ is raised occurring by diffusion, passing through a pseudo-sandwich configuration. In B3 only pseudo-sandwich behaviour is observed, over much the same regions of f and Γ as for A3.

The principal differences between the behaviours of the A and B series of mixtures are: the bronze-rich regions of the B mixtures contain less glass than the A mixtures under corresponding conditions; the formation of glass droplets within the bronze-rich phase and resulting rainfall is far less evident for mixtures A than in the case of B; the dynamics of the A series are somewhat faster than for the B series over much of the f-Γ plane.

For the mixtures C the parameter S=1. For C1 we observe very poor separation, with traces of sharp boundaries only visible over the limited frequency range of 25-90 Hz at lower values of Γ. We observe the formation of bronze-enhanced regions close to the upper surface at some lower frequencies and bronze-enhanced regions at intermediate levels at some higher frequencies. We also observe some oscillatory behaviours of the bronze-enhanced regions. However, the separation is always very poor; the sharp separation boundary, where it does exist, distinguishes regions containing a considerable proportion of the other component. At all frequencies increasing Γ readily induces global convection currents which thwart any tendency to separate. Mixtures C2 and C3 exhibit even weaker tendencies to separate.

For the mixtures D, S=0.4. The air-damping of the bronze is now greater than that of the glass. For mixture D1, separation with glass uppermost is experienced at all frequencies investigated as Γ is slowly increased. Sharp separation boundaries are observed. The onset of separation occurs at about Γ=2 for frequencies about 100 Hz, reducing to Γ=1.6 at 20 Hz and Γ=1.7 at 180 Hz. At lower frequencies, almost pure glass forms above a bronze-rich lower layer. At higher frequencies the lower bronze region is domed, due to the influence of the convection cells in the two materials. As Γ is increased, at any particular frequency, global convection causes mixing. This occurs at Γ=3.2 around 100 Hz, and at Γ=2.3 both at 20 Hz and 180 Hz. For higher values of Γ weak attempts at separation are thwarted by rapid global convection. Nevertheless, attempts at sandwich formation can be identified at higher frequencies.

As the bronze concentration is increased the band of Γ values for which "glass on top" separation is found narrows and for D3 the sharpness of the boundary between the glass-rich and the bronze-rich regions is more diffuse.

In summary, we observe a very strong separation mechanism for mixtures A, particularly for those richer in glass. Small bronze-rich regions remain intact with sharp boundaries even when separated from the main bronze body under vigorous dynamics. Mixtures B exhibit an only slightly weaker tendency to separate. For mixtures A and B the dominant tendency is for the bronze to separate to the top. For mixture C, where the two species are estimated to be equally damped, only a very weak tendency to separate is exhibited, while for mixtures D there is a tendency to separate with glass at the top. This separation is, however, appreciably weaker than for A and B and is thwarted at higher Γ by global convection.

The crude basis for the use of the parameter S should be noted. It is clear that S is not the sole defining parameter; the size ratio will clearly play some role, especially for small values of S, and size segregation mechanisms may come into play. Nevertheless, these results provide broad support for the differential air-damping hypothesis.

Further Experiments

Burtally et al [19] have reported that the separation of mixture B1 disappears at sufficiently low pressures which vary approximately linearly with frequency. These pressures are in reasonable agreement with a simple theory based on treating the system as a granular bed and using Stokes' law to introduce viscous damping. We have repeated these experiments on mixtures A and B and find similar pressures for the two mixtures. Vibration is applied to cause separation and the pressure is then slowly lowered. Through a range of sufficiently low pressures the separation boundaries become more diffuse. The glass-rich region increasingly contains more bronze while the bronze-rich region has increasing glass concentration. The rate of convection increases, with appreciable downward convection at the larger faces of the box. Convective currents eventually cause global mixing. For A1 this occurs at pressures of about 20-25 mbar at 40 Hz and 75-85 mbar at 160 Hz. These figures are not appreciably different from those for mixture B1. We have further tested the involvement of air in the separation process by conducting experiments using a box constructed with glass walls but with a porous bottom. The bottom surface consists of a layer of 63 μm woven steel sieve mesh supported by a 3 mm layer of metal foam. This structure is extremely porous to air, while being rigid to particle collisions. The top of the box may be open or closed, using small bungs.

With the top of the box open we find no tendency to separate in any of our mixtures. Rather we observe global mixing convection. With the top of the box closed, however, we observe the separation of mixtures A and B with a bronze-rich layer uppermost. This causes us to believe that it is necessary to positively drive the fluid through the bed of particles, not simply to have the fluid present.

Discussion

We have produced evidence for very strong separation effects both in glass/bronze mixtures of equal size but also in other mixtures, particularly those where the parameter S is considerably greater than unity. These separation effects are noteworthy, both for the very sharp interfaces between homogeneous bronze-rich and glass-rich phases, and for the immunity of these phases and interfaces to violent disturbances. We have shown, for example, that both large and small fragments of the bronze-rich phase may circulate during inversion oscillations, with the interface intact. A curious but key feature of the separation is the occurrence solely of convection within each component, rather than global mixing convection.

For each of the mixtures A and B we can produce separation within seconds, in which the glass is essentially pure and the bronze contains only 1-2% of glass by volume. It is clear that the separation mechanism is based on the interstitial air. All separation effects vanish at sufficiently low pressures. The magnitudes and frequency dependence of the failure pressure also supports this hypothesis. We note that as the particle sizes are both increased, the separation mechanism weakens, the sharp separation boundaries becoming increasingly diffuse. The separation effects have largely disappeared by sizes of 400 μm. This failure for large particles is to be expected for an air-driven mechanism. The supposition that it is the differential air damping of the two species is supported by the present experiments in which the parameter S is varied and by the visual observation of the far greater kinetic activity in the bronze rich phases in mixtures A and B. In the D mixtures there is greater activity in the upper glass phase.

Given a strong tendency for the glass and bronze to separate, based on differential air damping, many of the features we observe can be readily explained. The more damped phase, the glass-rich phase in the case of mixtures A and B, will be relatively compact and inert. It will be difficult for bronze to re-enter such a phase. The bronze-rich phase on the other hand will be relatively dilate; glass will find it possible to enter. Equilibrium will be maintained by the formation of glass droplets which subsequently "rain" upwards or downwards. In mixtures A the bronze is larger than in mixtures B; there will be more interstitial space in the bronze rich phase. This would explain why we observe a greater proportion of glass within the bronze-rich phase of A than within that of B with correspondingly more droplet formation and rainfall in A.

Other aspects are harder to deduce from the mere existence of a strong differential air damping separation mechanism. The preference for the "bronze on top" or the sandwich configuration, the position of the sandwich layer in the later case, and the inversion behaviours are more difficult to predict. The curious relationship between local rather than global convection and the separation itself also need clarification.

Burtally et al [19] have noted that regions slightly richer in the less damped component will be more dilate. The more active component will preferentially tend to diffuse to such a region enhancing that component. It is suggested that this may cause a dynamical instability leading to "phase separation". Our present experiments using a porous bottomed box have shown that just the presence of air is not sufficient to cause separation. If air is free to move up and down with the granular bed, no separation occurs. However, in a solid bottomed box, air is forced through the bed as it moves with respect to the box during the vibration. Strong separation may then occur. The case of the porous bottomed box with a sealed top is intermediate between these two situations since, due to the volume of air above the granular bed, air is only partially forced through the bed during vibration. "Bronze on top", but not sandwich formation, is then observed. It is clear from this key piece of evidence that the separation mechanism is more subtle than that proposed by Burtally et al [19]. The situation may be clarified by suitable computer simulations. Preliminary simulations, using Stokes' law to incorporate viscous damping, confirm that separation is dependent upon air being forced through the bed.

Figure 9:
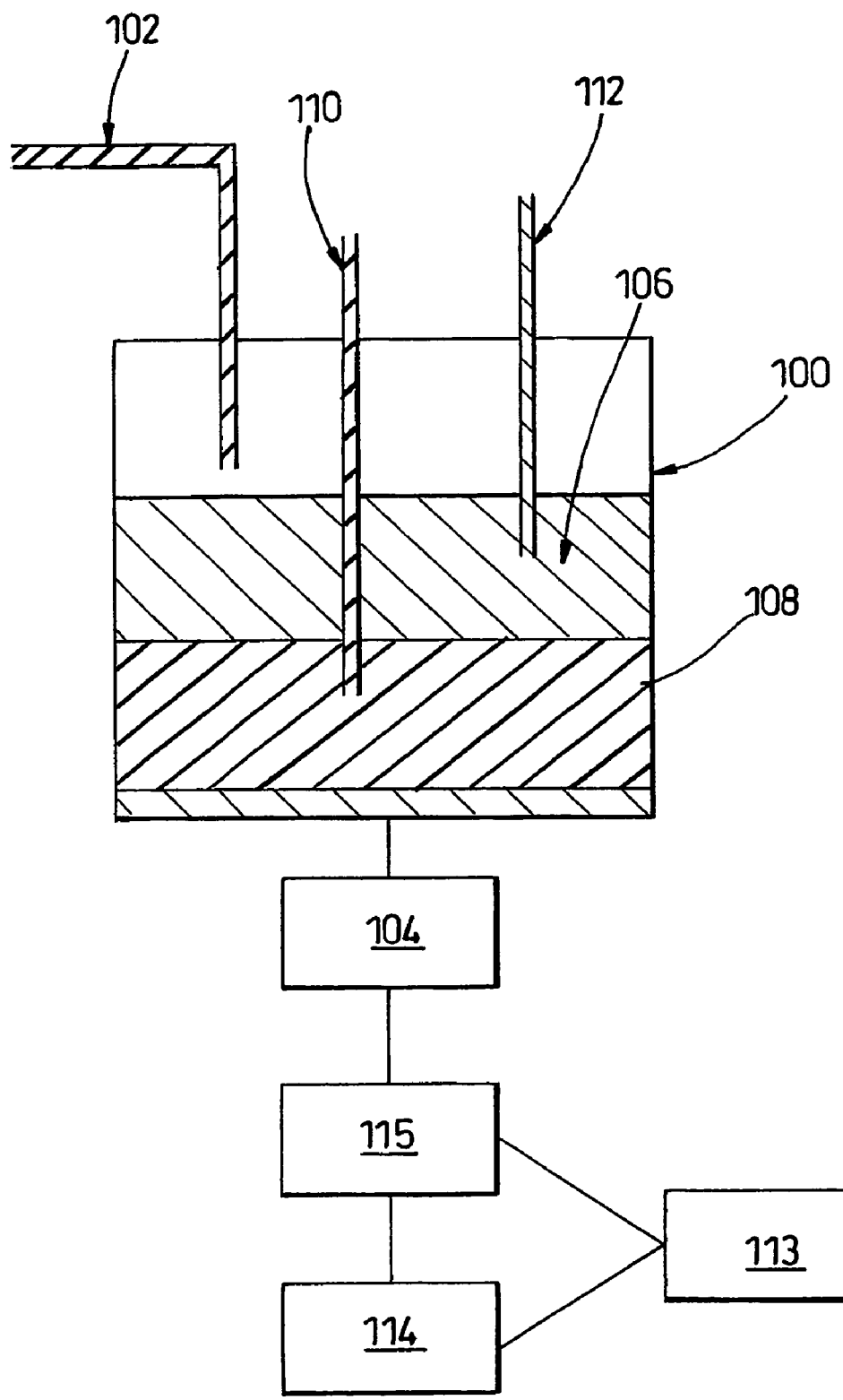

FIG. 9 shows a container 100, having a continuous supply of a mixture of first and second particles via inlet pipe 102. It should be understood that this arrangement may be used for both batch or continuous processes. This example shows a partially filled box. The box is vibrated vertically by an electromechanical oscillator 104. Within a matter of seconds two distinct bands form, with a sharp boundary between them. There is an upper band of denser material 106 and a lower band/layer of less dense material 108. This presupposes that the particles going in are of similar diameter, but different densities.

A first extraction conduit 112 extends into the upper layer 106, and a second extraction conduit 110 extends into the lower layer 108. We have found that if tubes are placed into the layers as shown in FIG. 9 there is an outflow of separated particles from the layer. This provides a way of continuously extracting particles from the layers, after they have been separated into the different kinds of particle. Thus a continuous process may be effected. The flow rates should be manipulated so material may be added via pipe 102 and extracted by pipes 110 and 112. It may be desirable to have the position of the lower end of the pipes 110 and 112 adjustable so as to ensure that they are properly located in the appropriate layer of particles.

The electromechanical oscillator is controlled by a manual control input device 113. The manual control input is linked to a signal generator 114 and an amplifier 115. The amplifier is linked to the electromechanical oscillator.

Of course, outlets for the particles may be provided at the side of the box, rather than up vertical pipes.

Figure 10:
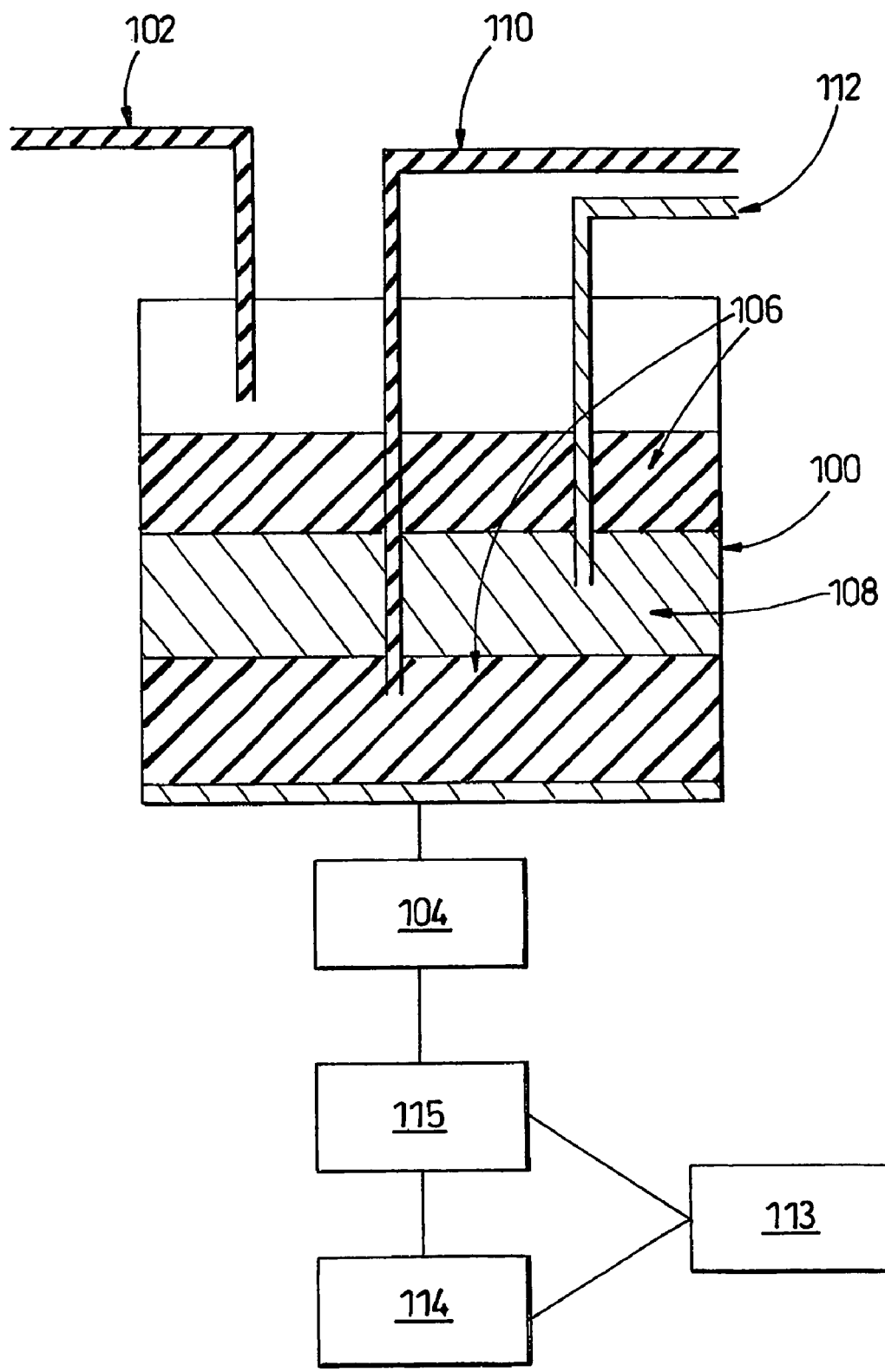

FIG. 10 shows an partially filled container arrangement similar to FIG. 9, but with the frequency of vibration this time being at a relatively high frequency—so that three layers are formed rather than the two layers that were formed shown in FIG. 9 (relatively low frequency). The middle layer is a denser layer than the top and bottom layers. Pipe 110 is seen to delve into the lower less dense layer, while pipe 112 delves into the denser "sandwiched" layer.

Figure 11:
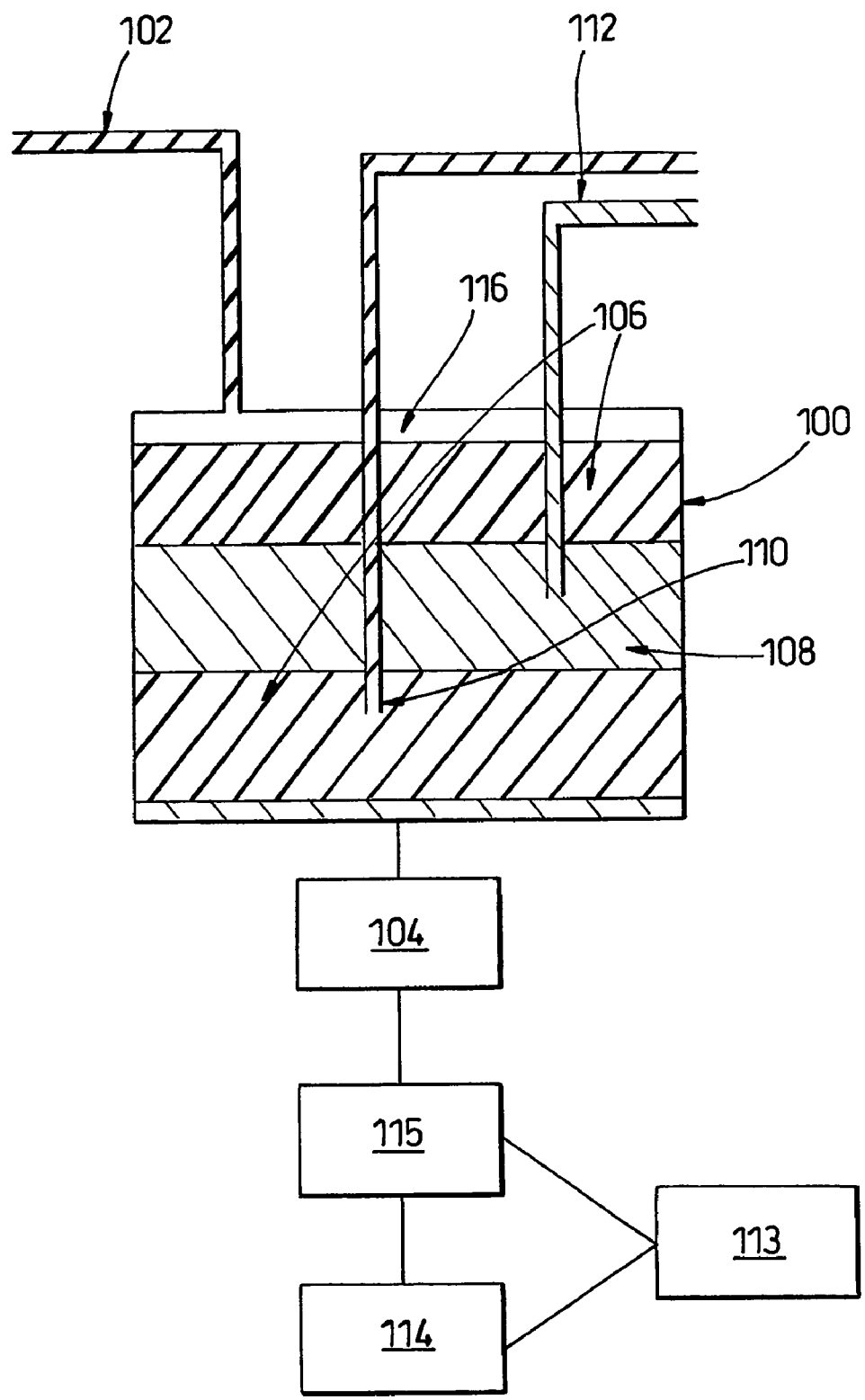

FIG. 11 shows a "filled" container arrangement to which vertical vibrations are applied. Pipes 110, and 112 are shown to delve into the separated particulate bed. A small amount of space is left in the container 116 in order that dilation of the bed may be achieved during vibration.

Figure 12:
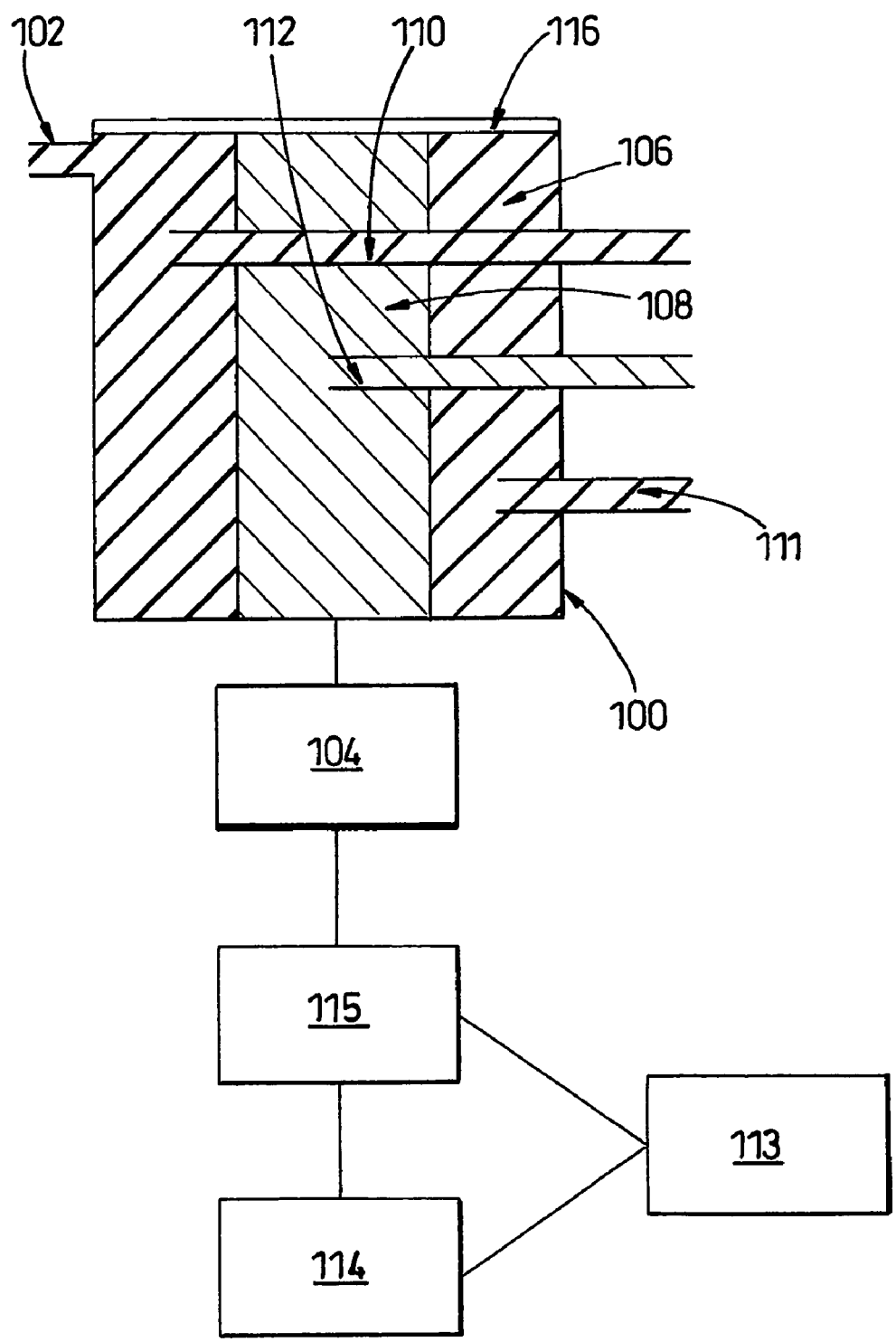

FIG. 12 shows an arrangement of a "filled" container that has been subjected to substantially horizontal vibration at high frequency. This leads to a sandwich layer formation as in FIGS. 10 and 11, except that the layers are resolved into substantially vertical strata. A small amount of space is left in the container 116 in order that dilation of the bed may be achieved during vibration. Pipes 110, 111 and 112 are shown to delve into the separated particulate bed.

We have performed tests with non-ideal particles, i.e., particles not having a uniform shape, for example not being substantially spherical. In one example, we have performed tests with sand and coal dust particles. It has been found that the methods of the present invention work extremely well on these mixtures. The less regular nature of the particles shape does not appear to adversely affect the principles nor the efficacy of the present invention.

REFERENCES

1. H. M. Jaeger, S. R. Nagel, R. P. Behringer, *Rev. Mod. Phys.* 68, 1259 (1996).
2. H. J. Herrmann, J.-P. Hovi, S. Luding, Eds., *Physics of Dry Granular Media* (NATO ASI Series E, Vol. 350, Kluwer, Dordrecht, (1998).
3. S. McNamara, W. R. Young, *Phys. Rev. E* 53, 5089 (1996).
4. J. Rajchenbach, *Adv. Phys.* 49, 229 (2000).
5. J. B. Knight et al., *Phys. Rev. E* 54, 5726 (1996).
6. K. M. Aoki, T. Akiyama, Y. Maki, T. Watanabe, *Phys. Rev. E* 54, 874 (1996).
7. C. R. Wasgren, C. E. Brennen, M. L. Hunt, *J. Appl. Mechanics* 63, 712 (1996).
8. S. S. Hsiau, S. J. Pan, *Powder Technology* 96, 219 (1998).
9. C. Bizon, M. D. Shattuck, J. B. Swift, W. D. McCormick, H. L. Swinney, *Phys. Rev. Lett.* 80, 57 (1998).
10. P. K. Das, D. Blair, *Phys. Lett. A* 242, 326 (1998).
11. A. Rosato, K. J. Strandburg, F. Prinz, R. H. Swendsen, *Phys. Rev. Lett.* 58, 1038 (1987).
12. H. K. Pak, E. Van Doorn, R. P. Behringer, *Phys. Rev. Lett.* 74, 4643 (1995).
13. M. Faraday, *Philos. Trans. R. Soc.* London 52, 299 (1831).
14. P. Evesque, J. Rajchenbach, *Phys. Rev. Lett.* 62, 44 (1989).
15. J. Duran, *Phys. Rev. Lett.* 84, 5126 (2000).
16. B. Thomas, A. M. Squires, *Phys. Rev. Lett.* 81, 574 (1998).
17. K. Kumar, E. Falcon, K. M. S. Bajaj, S. Fauve, *Physica A* 270, 97 (1999).
18. J. M. Ottino, D. V. Khakhar, *Annu. Rev. Fluid Mech.* 32, 55 (2000).
19. N. Burtally, P. J. King, M. R. Swift, *Science*, 295, 1877-1879, (2002).

The invention claimed is:

1. A method of separating a particulate mixture comprising different particle types comprising:
   supporting the particulate mixture by a fluid impermeable support; and
   vibrating the fluid impermeable support to drive fluid, interstitial to particles of the particulate mixture, through the particulate mixture at an amplitude and frequency to produce damping forces on substantially all the particles wherein a difference between the damping forces on each particle type causes the particulate mixture to separate into strata, each stratum being rich in at least one particle type.

2. The method of claim 1, comprising selecting the fluid such that the fluid has the required viscosity to achieve the required damping forces to cause the separation of the different particle types during vibration of the fluid impermeable support.

3. The method of claim 1 comprising defining a range of frequencies of vibration of the fluid impermeable support, over which separation of the particulate mixture into the strata is effected, for a given particulate mixture, and vibrating the fluid impermeable support at a frequency within said range of frequencies.

4. The method of claim 3 comprising varying the degree of separation of the particulate mixture within said range of frequencies.

5. The method of claim 1 comprising providing the fluid in the form of a gas.

6. The method of claim 5 comprising providing the gas in the form of air.

7. The method of claim 1 comprising providing the fluid in the form of a liquid.

8. The method of claim 7 comprising providing the liquid in the form of water.

9. The method of claim 1 performed on a mixture having particle types having a $G_{50}$ grain size of between 20 and 500 µm.

10. The method of claim 1 performed on a particulate mixture having at least two component particle types which have values of the expression $d''\rho$ that differ by at least 20%, wherein d is the mean diameter of particles of the respective particle types, n is 2 and $\rho$ is the density of particles of the respective particle types.

11. The method of claim 10 comprising separating the particulate mixture such that a stratum that is substantially comprised of at least one of a more dense particle type and a larger particle type overlies a stratum substantially comprised of at least one of a less dense particle type and a smaller particle type.

12. The method of claim 1 comprising extracting particles from at least one stratum and at least one extraction point.

13. A method of separating a particulate mixture comprising different particle types, the method comprising:
   supporting the particulate mixture by a fluid impermeable support;
   driving fluid, interstitial to particles of the particulate mixture, through the particulate mixture by vibrating the fluid impermeable support in order to separate the particulate mixture into strata, each stratum being rich in at least one particle type; and
   selecting a frequency and an amplitude of the vibration of the fluid impermeable support to have a value of gamma between 2 and 18 and a frequency between 0 Hertz and 200 Hertz.

\* \* \* \* \*